(12) United States Patent
Schweitzer et al.

(10) Patent No.: US 7,631,065 B2
(45) Date of Patent: Dec. 8, 2009

(54) SYSTEM, METHOD AND COMPUTER PROGRAM PRODUCT FOR MERGING DATA IN A NETWORK-BASED FILTERING AND AGGREGATING PLATFORM

(75) Inventors: Limor Schweitzer, Tel-Aviv (IL); Eran Wagner, Cupertino, CA (US); Tal Givoly, Cupertino, CA (US)

(73) Assignee: Amdocs (Israel) Ltd., Ra'anana (IL)

( * ) Notice: Subject to any disclaimer, the term of this patent is extended or adjusted under 35 U.S.C. 154(b) by 2504 days.

(21) Appl. No.: 10/012,962

(22) Filed: Dec. 7, 2001

(65) Prior Publication Data

US 2002/0091811 A1    Jul. 11, 2002

Related U.S. Application Data

(63) Continuation of application No. 09/442,876, filed on Nov. 18, 1999, now Pat. No. 6,418,467.

(60) Provisional application No. 60/066,898, filed on Nov. 20, 1997, provisional application No. 60/109,095, filed on Nov. 19, 1998.

(51) Int. Cl.
G06F 13/00    (2006.01)
(52) U.S. Cl. .................................... 709/224
(58) Field of Classification Search ................ 709/224
See application file for complete search history.

(56) References Cited

U.S. PATENT DOCUMENTS

| | | | |
|---|---|---|---|
| 3,463,222 A | 8/1969 | Grames | 165/10 |
| 4,396,058 A | 8/1983 | Kurschner et al. | 165/8 |
| 4,449,573 A | 5/1984 | Pettersson et al. | 165/10 |
| 4,491,725 A | 1/1985 | Pritchard | 235/375 |
| 4,744,410 A | 5/1988 | Groves | 165/10 |
| 4,750,201 A | 6/1988 | Hodgson et al. | 379/144 |
| 4,870,561 A | 9/1989 | Love et al. | 364/192 |
| 4,883,948 A | 11/1989 | Sunyich | 235/382 |
| 5,008,929 A | 4/1991 | Olsen et al. | 379/114.28 |
| 5,103,464 A | 4/1992 | Capkun et al. | 375/106 |
| 5,103,475 A | 4/1992 | Shuen | 379/115.01 |
| 5,117,430 A | 5/1992 | Berglund | 370/85.1 |
| 5,285,494 A | 2/1994 | Sprecher et al. | 455/423 |
| 5,333,183 A | 7/1994 | Herbert | 379/112.07 |

(Continued)

FOREIGN PATENT DOCUMENTS

EP    0 498 751    8/1992

(Continued)

OTHER PUBLICATIONS

Office Action Summary from U.S. Appl. No. 11/058,956 which was mailed on Jul. 10, 2007.

(Continued)

*Primary Examiner*—Robert B Harrell
(74) *Attorney, Agent, or Firm*—Zilka-Kotab, PC

(57) ABSTRACT

A system and method are provided for processing network accounting information. A first network accounting record is received from a first source. Thereafter, the first network accounting record is correlated with accounting information available from a second source. The accounting information with which the first network accounting record is correlated is then used to enhance the first network accounting record.

20 Claims, 7 Drawing Sheets

U.S. PATENT DOCUMENTS

| | | | | |
|---|---|---|---|---|
| 5,491,796 | A | 2/1996 | Wanderer et al. | 709/102 |
| 5,500,934 | A | 3/1996 | Austin et al. | 395/755 |
| 5,557,746 | A | 9/1996 | Chen et al. | 709/202 |
| 5,615,323 | A | 3/1997 | Engel et al. | 345/440 |
| 5,627,886 | A | 5/1997 | Bowman | 379/111 |
| 5,659,601 | A | 8/1997 | Cheslog | 455/406 |
| 5,778,350 | A | 7/1998 | Adams et al. | 707/1 |
| 5,781,729 | A | 7/1998 | Baker et al. | 709/230 |
| 5,781,735 | A | 7/1998 | Southard | 709/223 |
| 5,793,853 | A | 8/1998 | Sbisa | 379/120 |
| 5,796,941 | A | 8/1998 | Lita | 713/201 |
| 5,812,529 | A | 9/1998 | Czarnik et al. | 370/245 |
| 5,819,028 | A | 10/1998 | Manghirmalani et al. | 714/57 |
| 5,832,068 | A | 11/1998 | Smith | 379/114.14 |
| 5,852,818 | A | 12/1998 | Guay et al. | 707/1 |
| 5,870,557 | A | 2/1999 | Bellovin et al. | 395/200.54 |
| 5,872,931 | A | 2/1999 | Chivaluri | 709/223 |
| 5,889,958 | A | 3/1999 | Willens | 709/229 |
| 5,905,715 | A | 5/1999 | Azarmi et al. | 370/244 |
| 5,905,868 | A | 5/1999 | Baghai et al. | 709/224 |
| 5,915,006 | A | 6/1999 | Jagadish et al. | 379/115.01 |
| 5,930,773 | A | 7/1999 | Crooks et al. | 705/30 |
| 5,941,955 | A | 8/1999 | Wilby et al. | 709/242 |
| 5,943,657 | A | 8/1999 | Freestone et al. | 705/400 |
| 5,958,010 | A | 9/1999 | Agarwal et al. | 709/224 |
| 5,987,107 | A | 11/1999 | Brown | 379/114.12 |
| 6,011,838 | A | 1/2000 | Cox | 379/112.06 |
| 6,023,694 | A | 2/2000 | Kouchi et al. | 707/2 |
| 6,032,147 | A | 2/2000 | Williams et al. | 707/101 |
| 6,088,659 | A | 7/2000 | Kelley et al. | 702/62 |
| 6,088,688 | A | 7/2000 | Crooks et al. | 705/412 |
| 6,101,170 | A | 8/2000 | Doherty et al. | 370/255 |
| 6,104,704 | A | 8/2000 | Buhler et al. | 370/252 |
| 6,104,711 | A | 8/2000 | Voit | 370/352 |
| 6,128,657 | A | 10/2000 | Okanoya et al. | 709/224 |
| 6,148,335 | A | 11/2000 | Haggard et al. | 709/224 |
| 6,157,648 | A | 12/2000 | Voit et al. | 370/401 |
| 6,181,679 | B1 | 1/2001 | Ashton et al. | 370/244 |
| 6,189,101 | B1 | 2/2001 | Dusenbury, Jr. | 726/2 |
| 6,208,720 | B1 | 3/2001 | Curtis et al. | 379/114 |
| 6,216,169 | B1 | 4/2001 | Booman et al. | 709/246 |
| 6,230,203 | B1 | 5/2001 | Koperda et al. | 709/229 |
| 6,243,667 | B1 | 6/2001 | Kerr et al. | 703/27 |
| 6,272,126 | B1 | 8/2001 | Strauss et al. | 370/352 |
| 6,308,148 | B1 | 10/2001 | Bruins et al. | 703/27 |
| 6,320,944 | B1 | 11/2001 | Schlossman et al. | 379/117 |
| 6,359,976 | B1 | 3/2002 | Kalyanpur et al. | 379/134 |
| 6,405,251 | B1 | 6/2002 | Bullard et al. | 709/224 |
| 6,418,467 | B1 | 7/2002 | Schweitzer et al. | 709/223 |
| 6,452,925 | B1 | 9/2002 | Sistanizadeh et al. | 370/352 |
| 6,470,386 | B1 | 10/2002 | Combar et al. | 709/224 |
| 6,598,078 | B1 | 7/2003 | Ehrlich et al. | 709/224 |
| 6,601,048 | B1 | 7/2003 | Gavan et al. | 706/10 |
| 6,650,639 | B2 | 11/2003 | Doherty et al. | 370/389 |
| 6,658,465 | B1 | 12/2003 | Touboul | 709/223 |
| 6,751,738 | B2 | 6/2004 | Wesinger, Jr. et al. | 713/201 |
| 6,850,974 | B2 | 2/2005 | Schweitzer et al. | 709/223 |
| 6,947,984 | B2 | 9/2005 | Schweitzer et al. | 709/224 |
| 6,985,941 | B2 | 1/2006 | Schweitzer et al. | 709/224 |
| 7,058,600 | B1 | 6/2006 | Combar et al. | 705/34 |
| 7,412,510 | B2 | 8/2008 | Schweitzer et al. | 709/224 |
| 2008/0059346 | A1 | 3/2008 | Schweitzer et al. | 705/30 |

FOREIGN PATENT DOCUMENTS

| | | |
|---|---|---|
| EP | 1 006 690 | 6/2000 |
| EP | 1 039 693 | 9/2000 |
| EP | 1 094 635 | 4/2001 |
| WO | WO 91/03023 | 3/1991 |
| WO | 98/28879 | 7/1998 |

OTHER PUBLICATIONS

Notice of Allowability from U.S. Appl. No. 09/935,129 which was mailed on Apr. 28, 2005.

Examiner's Supplemental Amendment from U.S. Appl. No. 09/935,129 which was mailed on Jan. 4, 2005.

Notice of Allowance from U.S. Appl. No. 09/935,129 which was mailed on Aug. 17, 2004.

Office Action Stummary from U.S. Appl. No. 09/935,129 which was mailed on Mar. 22, 2004.

Office Action Summary from U.S. Appl. No. 09/935,129 which was mailed on Aug. 27, 2003.

Notice of Allowance from U.S. Appl. No. 09/935,139 which was mailed on Jun. 10, 2004.

Office Communication from U.S. Appl. No. 09/935,139 which was mailed on Jan. 23, 2004.

Office Action Summary from U.S. Appl. No. 09/935,139 which was mailed on Aug. 14, 2003.

Advisory Action from U.S. Appl. No. 09/935,139 which was mailed on May 5, 2003.

Final Office Action Summary from U.S. Appl. No. 09/935,139 which was mailed on Feb. 26, 2003.

Office Action Summary from U.S. Appl. No. 09/935,139 which was mailed on Sep. 11, 2002.

Supplemental Notice of Allowability from U.S. Appl. No. 09/935,130 which was mailed on Aug. 22, 2005.

Notice of Allowability from U.S. Appl. No. 09/935,130 which was mailed on Apr. 27, 2005.

Examiner's Supplemental Amendment from U.S. Appl. No. 09/935,130 which was mailed on Jan. 4, 2005.

Notice of Allowance from U.S. Appl. No. 09/935,130 which was mailed on Aug. 13, 2004.

Final Office Action Summary from U.S. Appl. No. 09/935,130 which was mailed on May 18, 2004.

Final Office Action Summary from U.S. Appl. No. 09/935,130 which was mailed on Mar. 5, 2004.

Office Action Summary from U.S. Appl. No. 09/935,130 which was mailed on Oct. 3, 2003.

Notice of Allowance from U.S. Appl. No. 11/058,956 which was mailed on Jun. 6, 2008.

Office Action Summary from U.S. Appl. No. 11/058,956 which was mailed on Dec. 6, 2007.

Office Action Summary from U.S. Appl. No. 11/058,956 which was mailed on Nov. 15, 2006.

Office Action Summary from U.S. Appl. No. 11/850,465 which was mailed on Nov. 13, 2008.

XACCT Usage Overview, XACCT Technologies, 1997.

HP and Cisco Deliver Internet Usage Platform and Billing and Analysis Solutions (http://www.hp.com/smartinternet/press/prapr28.html), Hewlett Packard Company, 1998.

Article, Quadri, et al., Internet Usage Platform White Paper (http://www.hp.com/smartinternet/solutions/usagewp.), Hewlett Packard Company, 1998.

Article, Strategies for Managing IP Data (http://www.hp.com/smartinternet/press/not.html), Hewlett Packard Company Undated.

Article, Nattkemper, HP and Cisco Deliver Internet Usage and Billing Solutions (http://www.interex.org/hpworldnews/hpW806.html), Hewlett Ppackard Company, Jun. 1, 1999(?).

HP Smart Internet Billing Solution (http://hpcc925.external.hp.com/smartinternet/solutions/usagebilling.html), Hewlett Packard Company, 1998.

HP Smart Internet Usage Analysis Solution (http://www.hp.com/smartinternet/solutions/usageanalysis.html), Hewlett Packard Company, 1998.

Press Release, New cisco IOS NetFlow Software and Utilities Boost Service Provider Revenues and Service Management Capabilities (http://www.cisco.com/warp/public/cc/cisco/mkt/gen/pr/archive/cros pr.htm), Cisco Systems, Inc., Jul. 1, 1997.

Documentation, NewFlow Flow Collector 2.0 (http://www.cisco.com/univerca/cc/td/doc/product/rtrmgmt/nfc/nfc 2 0/index.htm), Cisco Systems, Inc., 1998.

Article, Mary Jander, Hot Products: Network Management—Usage Monitoring Intranet Inspector (http://www.data.com/issue/990107/manage3.html), Tech Web, CMP Media Inc., Jan. 1999.

Article, Loring Wirbel, Tools coming for probing, for probing, billing of IP packets (http://www.techweb.com/se/directlink.cgi?EET19981214S0033), EETIMES, Issue 1039, Section: Systems & Software, Dec. 14, 1998, CMP Media Inc.

Article, Loring Wirbel, Tools enable usage-based billing on the Net (http://www.eetimes.com/story/OEG19981208S0007), EETIMES, Dec. 8, 1998, CMP Media Inc.

Article, Limor Schweizer, Meeting the IP Network Billing Challenge (http://www.tmcnet.com/tmcnet/articles/xacct1298.htm), TMCnet, Dec. 1998(?).

Product Review, XACCTusage (http://www.xacct.com/news/xuoverview.htm), internet.com, Internet Product Watch (?) Undated.

Article, Loring Wirbel, In next-generation networks. ISPs are calling the shots (http://www.techweb.com/se/direct link,ctiI?EET19981019 S0058), EETIMES, Issue 1031, Section: Communications, Oct. 19, 1998, CMP Media Inc.

Article, Kate Gerwig, ISPs take 'Do-It-Yourself Tack With Billing (http://www.internetwk.com/news1098/news101398-3.htm), CMP's Tech Web, CMP Media Inc., Oct. 12, 1998.

Article, Kathleen Cholewka, Xacct Makes It Easier to Bill For IP Service (http://www.zdnet.com/intweek/daily/981005d.html), Inter@active Week, ZDNet, Oct, 5, 1998.

Article, Lucas et al., Mediation in a Multi-Service IP Network (http://www.xacct.com/news/art100198.html), XACCT Technologies, Inc., Oct. 1, 1998.

Article, Matt Hamblen, Middleware enables 'net usage planning (http://www.xacct.com/news/art092898.html), Computerworld, vol. 32, No. 29, Sep. 28, 1998.

Article, Tim Greene, XAACT pinpoints IP network usage (http://www.xacct.com/news/art092198.html), NetworkWorld, vol. 15, No. 38, Sep. 21, 1998.

Article, Margie Semilof, Charging, for IP use gets easier (http://www.xacct.com/news/art092198b.html), Computer Reseller News, Sep. 21, 1998.

Article, Kate Gerwig, Creating Meter Readers For The Internet (http://www.techweb.com/se/directlink,cgi?INW19980921S0042), Internetweek, Issue: 733, Section: Bandwidth, Sep. 21, 1998, CMP Media Inc.

Article, John Morency, XaCCT offers multivendor, multi-technology billing model for ISP consumption (http://www.nwfusion.com/newsletters/nsm/0914nm2.html), Newwork World Fusion Focus on Network/Systems Management, Network World, Inc., Sep. 16, 1998.

Article, Shira Levine, XACCT brings flexible billing to the IP world. (http://www.americasnetwork.com/news/9809/980915 xacct.html), Advanstar Communications, Sep. 15, 1998.

Telecom Product News. Accounting and Reporting System for Corporate Network Resouce and IS Use (http://www.xacct.com/news/pressreleases/papers3.html), XACCT Technologies, Inc., Apr. 1998.

Article, BYTE's Best of Show Award at CeBIT Goes To SuperNova;s Visual Concepts (http://www.byte.com/special/3cebit98.htm), Byte, Mar. 23, 1998.

Press Release, XACCT Teams With Kenan to Provide Advanced Solution For Usage-Based Billing of IP Applications (http://www.xacct.com/news/pressreleases/papers8.html), XACCT Technologies, Inc., Oct. 26, 1998.

Press Release, Solect and XACCT Partner to Provice IP Usage-based Billing Solution (http://www.xacct.com/news/pressreleases/papers7.html), XACCT Technologies, Inc., Sep. 28, 1998.

Press Release, XACCT Supports Cisco's New Web-Based Enterprise Management Suite (http://www.xacct.com/news/pressreleases/papers6.html), XACCT Technologies, Inc., Sep. 22, 1998.

Press Release, XACCT Technologies Enables Usage-Based Billing for Internet (http://www.xacct.com/news/pressreleases/papers4,html), XACCT Technologies, Inc., Sep. 21, 1998.

News Release, XACCT Technologies Now shipping Accounting and Reporting System for Corporate network Resource and ISP Use (http://www.xacct.com/news/pressreleases/papers1.html), XACCT Technologies, Inc., Mar. 19, 1998.

News Release, XACCT Technologies Releases Accounting and Reporting System for ISP and Corporate Network Resource Use (http://www.xacct.com/news/pressrelease/papers.html), XACCT Technology, Inc., Dec. 10, 1997.

Office Action Summary from U.S. Appl. No. 11/850,465 mailed on Jul. 20, 2009.

SYSTEM, METHOD AND COMPUTER PROGRAM PRODUCT FOR MERGING DATA IN A NETWORK-BASED FILTERING AND AGGREGATING PLATFORM

CROSS REFERENCE TO RELATED APPLICATIONS

This application is a continuation of U.S. patent application Ser. No. 09/442,876, filed Nov. 11, 1999, titled NETWORK ACCOUNTING AND BILLING SYSTEM AND METHOD, now U.S. Pat. No. 6,418,467.

The present application claims priority of a PCT application filed Nov. 20, 1998 under Ser. No. PCT/US98/24963, a first provisional patent application filed Nov. 20, 1997 under Ser. No. 60/066,898, and a second provisional patent application filed Nov. 19, 1998 under Ser. No. 60/109,095.

COPYRIGHT NOTICE

A portion of the disclosure of this patent document contains materials that are subject to copyright protection. The copyright owner has no objection to the facsimile reproduction by anyone of the patent disclosure, as it appears in the Patent and Trademark Office patents, files, or records, but otherwise reserves all copyright rights whatsoever.

BACKGROUND OF THE INVENTION

A. Field of the Invention

This invention relates to the field of computer networks. In particular, the invention relates to accounting and billing for services in a computer network.

B. Description of the Related Art

The low cost of Internet connectivity and a wide range of services are driving and more people onto the Internet, which is driving the deployment of TCP/IP networks. This process has led to a new market of client-server applications that enables the user to interact with other users and computer systems around the world. The use of these applications is consuming more and more Intranet and Internet bandwidth.

New applications such as "voice over IP (Internet Protocol)" and streaming audio and video require even more bandwidth and a different quality of service than email, or other less real-time applications. Also, the type quality of service can vary according to the needs of the user. For example, typically, businesses do not tolerate unavailable network services as easily as consumers. Internet Service Providers (ISPs) therefore would like to price their available bandwidth according to a user's needs. For example, flat monthly pricing may be the best billing model for consumers, but businesses may want to be billed according to their used bandwidth at particular qualities of service.

As ISPs continue to differentiate themselves by providing additional services, enterprise information technology managers will face similar problems to account for the escalating Intranet operating costs.

Therefore, ISPs and enterprise information technology managers will want to account for session logging, bandwidth usage, directory data and application session information from a variety of sources.

Due to the diversity of IP data sources (e.g., routers, hubs etc.), the need for effect tracking far exceeds the problems addressed by telephone companies. Telephone companies track information such as circuit usage so it can be correlated with account information. For example, businesses may use leased lines, consumers may have "Friends and Family" plans, cellular phones have different roamer fees according to the location of the user, etc. Typically, the phone company captures all of the data and uses batch processing to aggregate the information into specific user accounts. For example, all the long distance calls made during a billing period are typically correlated with the Friends and Family list for each phone account at the end of a billing period for that account. This requires a significant amount of computing power. However, this type of problem is significantly simpler than attempting to track and bill for every transaction in an IP network. Therefore, what is desired is a system that allows for accounting and billing of transactions on EP based networks.

The problem is even more difficult in IP network traffic because the information sources can exist and many different levels of the OSI network model, throughout heterogeneous networks. Potential sources of information include packet use from routers, firewall authentication logging, email data, ISP session logging, and application layer use information. Therefore, what is desired is a system and method that track IP network usage information across multiple layers of the OSI network model.

SUMMARY OF THE INVENTION

A network accounting and billing system and method are described. In some embodiments, the system can access any network related information sources such as traffic statistics provided by routers and switching hubs as well as application server access logs. The information can be accumulated in a central database for creating auditing, accounting and billing reports. Alternatively, the information can be sent directly to other systems such as rating engines used in customer care and billing systems.

In one embodiment, network traffic information is captured at network information sources (examples of information sources include network devices). These sources provide detailed information about the network communications transactions at a network device. Importantly, different types of sources can provide different types of information. Gatherer devices gather the detailed information from the various information source devices and convert the information into standardized information. The gatherer devices can correlate the gathered information with account information for network transaction accounting. Manager devices manage the gatherer devices and store the gathered standardized information. The manager devices eliminate duplicate network information that may exist in the standardized information. The manager devices also consolidate the information. Importantly, the information stored by the manager devices represents the consolidated, account correlated, network transaction information used for billing. In addition to account information, transaction information can be correlated to other information such as geography information (e.g., the location of an accessed server) and/or transaction routing information (as may be used in peering agreements between Internet Service Providers). The system thereby provides a distributed network accounting and billing system.

In some embodiments, the gatherer devices can access sources through proxy gateways, firewalls, and/or address translation barriers.

In some embodiments, the gatherer devices can correlate the information about a specific transaction with a particular account by accessing the transaction's source and/or destination information. The source and/or destination information is then correlated with account information from an account information database.

BRIEF DESCRIPTION OF THE FIGURES

The figures illustrate the invention by way of example. The invention is not meant to be limited to only those embodiments of shown in the Figures. The same reference in different figures indicates the same element is being used in those figures.

DETAILED DESCRIPTION

A. System Overview

Figure 1:
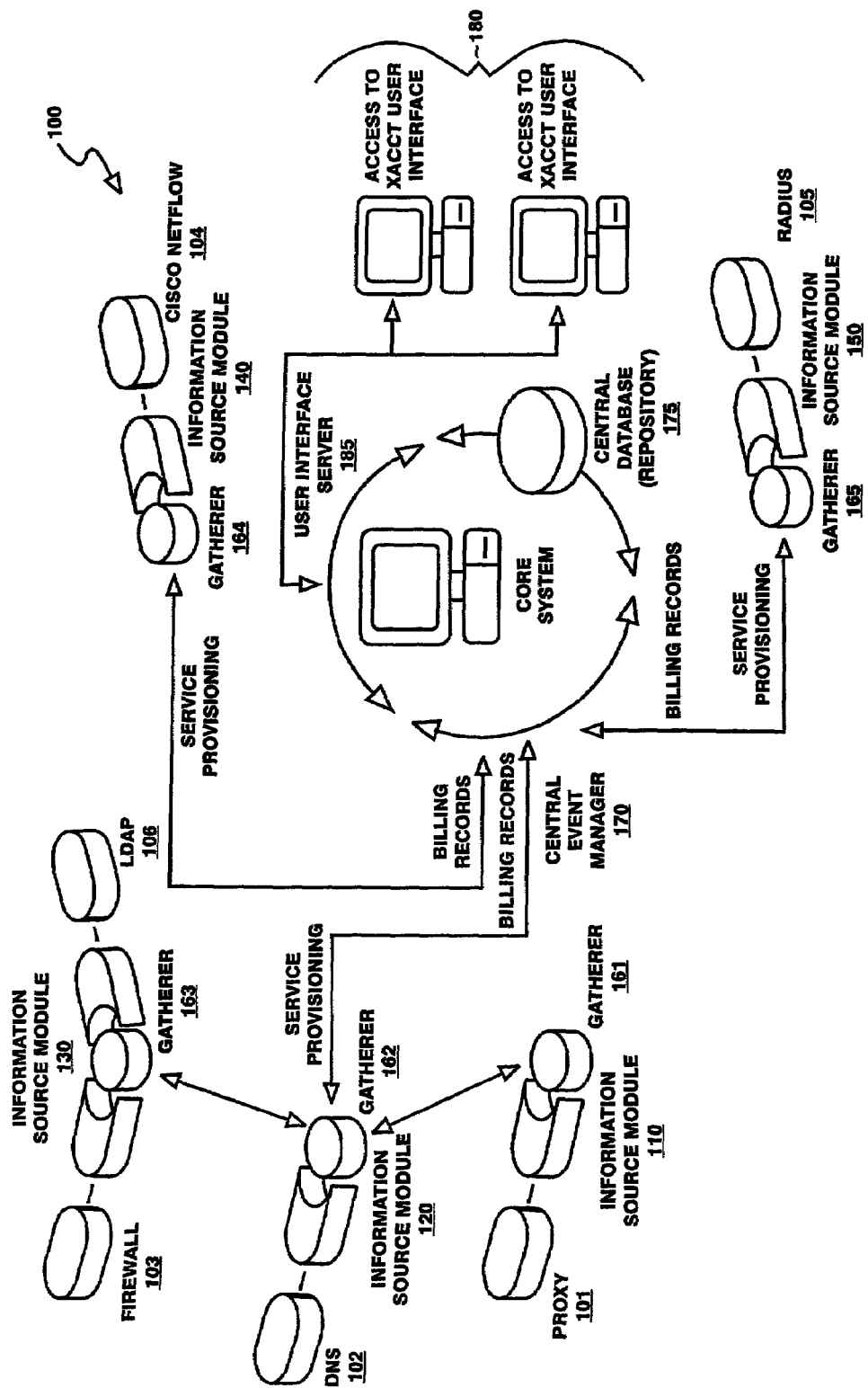
FIG. 1 illustrates a system including one embodiment of the invention.

One embodiment of the system includes a multi-source, multi-layer network usage metering and mediation solution that gives Network Service Providers (NSPs), including Internet Service Providers (ISPs) and enterprise network(Intranet) operators, the information needed to set the right-price for IP (Internet Protocol) services. With the system, the providers can generate accurate usage-based billing and implement usage-based charge-back models. The system derives IP session and transaction information, collected in real time, from a multitude of network elements. The system gathers, correlates, and transforms data from routers, switches, firewalls, authentication servers, LDAP, Web hosts, DNS, and other devices to create comprehensive usage and billing records.

The system transforms raw transaction data from network devices into useful billing records though policy-based filtering, aggregation, and merging. The result is a set of detail records (DRs). In some embodiments, the detail records are XaCCT Detail Records (XDRs™) available from XaCCT Technologies. DRs are somewhat similar in concept to the telephony industry's Call Detail Records (CDRs). Thus, DRs can be easily integrated with existing Customer Care and Billing (CCB) systems.

In addition to billing data, DRs enable NSPs to deploy new services based on documented usage trends, plan network resource provisioning, and audit service usage. The system provides a clear picture of user-level network service use by tracking a variety of metrics such as actual session Quality of Service (QoS),traffic routes, and end-user application transactions.

The system is based on a modular, distributed, highly scaleable architecture capable of running on multiple platforms. Data collection and management is designed for efficiency to minimize impact on the network and system resources.

The system minimizes network impact by collecting and processing data close to its source. Modular architecture provides maximum configuration flexibility, and compatibility with multiple network information sources.

The system, or other embodiments, may have one or more of the following features.

Data collection can be from a wide range of network devices and services, spanning all layers of the network—from the physical to the application layer.

Real-time, policy-based filtering, aggregation, enhancement and merging creates accurate, detailed and comprehensive session detail records (DRs).

Real time correlation of data from various sources allows billing record enhancement.

Leverages existing investment through integration with any customer care & billing solution, reducing costs, minimizing risks and shortened time-to-market.

Non-intrusive operation eliminates any disruption of network elements or services.

Web-based user interface allows off-the-shelf browsers to access the system, on-demand, locally or remotely.

Carrier-class scalability allows expansion to fit an NSPs needs without costly reconfiguration.

Distributed filtering and aggregation eliminates system capacity bottlenecks.

Efficient, centralized system administration allows on-the-fly system reconfigurations and field upgrades.

Customized reporting with built-in report generation or an NSPs choice of off-the-shelf graphical reporting packages.

Comprehensive network security features allow secure communication between system components and multiple levels of restricted access.

B. System Details

The following describes the system 100 of FIG. 1. The system 100 allows NSPs to account for and bill for IP network communications. The following paragraphs first list the elements of FIG. 1, then describes those elements and then describes how the elements work together. Importantly, the distributed data gathering, filtering and enhancements performed in the system 100 enables load distribution. Granular data can reside in the peripheries of the system 100, close to the information sources. This helps avoids reduce congestion in network bottlenecks but still allows the data to be accessible from a central location. In previous systems, all the network information flows to one location, making it very difficult to keep up with the massive record flows from the network devices and requiring huge databases.

The following lists the elements of FIG. 1. FIG. 1 includes a number of information source modules (ISMs) including an ISM 110, an ISM 120, an ISM 130, an ISM 136, an ISM 140, and an ISM 150. The system also includes a number of network devices, such as a proxy server 101, a DNS 102, a firewall 103, an LDAP 106, a CISCO NetFlow 104, and a RADIUS 105. The system also includes a number of gatherers, such as a gatherer 161, a gatherer 162, a gatherer 163, a gatherer 164, and a gatherer 165. The system of FIG. 1 also includes a central event manager (CEM) 170 and a central database (repository) 175. The system also includes a user interface server 185 and a number terminals or clients 180.

This paragraph describes how the elements of FIG. 1 are coupled. The various network devices represent devices coupled to an IP network such as the Internet. The network devices perform various functions, such as the proxy server 101 providing proxy service for a number of clients. Each network device is coupled to a corresponding ISM. For example, the proxy server 101 is coupled to the ISM 110. The DNS 102 is coupled to the ISM 120. The firewall 103 is coupled to the ISM 130. The ISM 136 is coupled to the LDAP 106. The ISM 140 is coupled to the CISCO NetFlow 104. The ISM 150 is coupled to the RADIUS 105. Each gatherer is associated with at least one ISM. Thus, the gatherer 161 is associated with the ISM 110 and is therefore coupled to that ISM. The gatherer 162 is coupled to the ISM 120. The gatherer 163 is coupled to the ISM 130 and the ISM 136. The gatherer 164 is coupled to the ISM 140. The gatherer 165 is coupled to the ISM 150. The various gatherers are coupled to the CEM 170. The user interface server is coupled to the terminals 180 and the CEM 170.

The following paragraphs describe each of the various elements of FIG. 1.

Network Devices

The network devices represent any devices that could be included in a network. (Throughout the description, a network device, unless specifically noted otherwise, also refers to an application server.) A network device represents a subset of information sources that can be used by the system 100. That is, the network devices are merely representative of the types of sources of information that could be accessed. Other devices such as on-line transaction processing databases can be accessed in other embodiments of the invention. Typically, the network devices keep logging and statistical information about their activity. A network information source can be the log file of a mail server, the logging facility of a firewall, a traffics statistics table available on a router and accessible through SNMP, a database entry accessible through the Internet, an authentication server's query interface, etc. The network devices represent the information sources accessed by the ISMs.

Each type of network device can be accessing using a different method or protocols. Some generate logs while others are accessible via SNMP, others have proprietary APIs or use other protocols.

ISMs

The ISMs act as an interface between the gatherers and the network devices enabling the gatherers to collect data from the network devices. Thus, the ISMs represent modular, abstract interfaces that are designed to be platform-neutral. The information source modules act as interfaces or "translators", sending IP usage data, in real time, from the network devices to the gatherers. Each ISM is designed for a specific type of network data source. (In other embodiments, some ISM are generic in that they can extract information from multiple network devices). ISMs can be packaged separately, allowing NSPs to customize ISM configurations to meet the specific requirements of their network. For example, in the system of FIG. 1, if the NSP did not have Cisco NetFlow devices, then the ISM 140 would not have to be included.

The ISMs can communicate with its corresponding network device using protocols and formats such as UDP/IP, TCP/IP, SNMP, telnet, file access, ODBC, native API, and others.

In some embodiments, the reliability of system 100 is enhanced through on-the-fly dynamic reconfiguration, allowing the NSP to add or remove modules without disrupting ongoing operations. In these embodiments, the CEM 170 can automatically update the ISMs.

The following ISMs are available in some embodiments of the invention.

Categorizer—Classifies a session to a category according to user-defined Boolean expression.

DNS (e.g. ISM 120)—Resolves host names and IP addresses.

Generic Proxy Server (e.g., ISM 110)—Collects data from access logs in a common log format.

Port/Protocol Resolution—Converts protocol/port information to account names and vice versa.

CheckPoint FireWall-1—Collects data from FireWall-1 accounting log and security log.

Cisco IOS IP Accounting—Collects accounting data from a Cisco router using IOS IP accounting.

Cisco NetFlow Switching—Collects session data from a Cisco router via NetFlow switching.

Netscape Proxy Server—Collects data from a Netscape Proxy Server.

Microsoft Proxy Server—Collects data from a Microsoft Proxy Server.

ISMs can be synchronous, asynchronous or pipe.

The data from an asynchronous ISM is dynamic so that the asynchronous ISM reacts to the information and relays it to the associated gatherer without prompting from other information sources in the system 100. If the firewall 103 were a CheckPoint-FireWall-1, then the ISM 130 would be an example of an asynchronous ISM. When a network session is initiated, the details are recorded by the FireWall-1 103. The corresponding ISM 130 receives the details and passes them on automatically to the gatherer 163.

Synchronous ISMs provide its information only when accessed by a gatherer. The ISM 120 is an example of a synchronous ISM. The DNS server 102 maintains information matching the IP addresses of host computers to their domain addresses. The ISM 120 accesses the DNS server 102 only when the ISM 120 receives a request from the gather 162. When the DNS server 102 returns a reply, the ISM 120 relays the reply information to the gatherer 162.

Pipe ISMs operate on record flows (batches of records received from information sources). Pipe ISMs process one or more enhancement flows the records as the flows arrive. The pipe ISM may initiate new record flows or may do other things such as generate alerts or provision network elements to provide or stop services. The pipe is implemented as an ISM to keep the internal coherency and logic of the architecture. (Record flows can terminate in a database or in a pipe ISM. The pipe ISM can perform filtering and aggregation, send alarms, or act as a mediation system to provision network elements when some event occurs or some accumulated value is surpassed. Specifically, pipe ISMs can act to enable pre-payment systems to disable certain services such as a voice IP call, when the time limit is surpassed or amount of data is reached.)

The gatherers can include caches and buffers for storing information from the ISMs. The buffers allow the gatherers to compensate for situations where there is a loss of connection with the rest of the system 100. The cache sizes can be remotely configured. The cache minimizes the number of accesses to the Information Source.

ISM queries can be cached and parallelized. Caching of synchronous ISM queries provides for fast responses. Parallelizing queries allows for multiple queries to be processed at the same time.

Gatherers

The gatherers gather the information from the ISMs. In some embodiments, the gatherers are multi-threaded, lightweight, smart agents that run on non-dedicated hosts, as a normal user application on Windows NT or Unix, as a background process, or daemon. What is important though is that the gatherers can be any hardware and/or software that perform the functions of a gatherer.

The gatherers can be installed on the same network segment as the network device such as router and switch or on the application server itself. This placement of a gatherer minimizes the data traffic impact on the network.

The gatherers collect network session data from one or more ISMs. Session data can be sent to another gatherer for enhancement or to the CEM 170 for merging and storing in the central database 170. The gatherers can be deployed on an as needed basis for optimal scalability and flexibility.

The gatherers perform flexible, policy-based data aggregation. Importantly, the various types of ISMs provide different data and in different formats. The gatherers normalize the data by extracting the fields needed by the CEM 170 and filling in any fields that may be missing. Thus, the gatherers act as a distributed filtering and aggregation system. The distributed data filtering and aggregation eliminates capacity bottlenecks improving the scalability and efficiency of the system 100 by reducing the volume of data sent on the network to the CEM 170.

Aggregation can be done by accumulating groups of data record flows, generating a single data record for each group. That single record then includes the aggregated information. This reduces the flow of the data records.

Filtering means discarding any record that belongs to a group of unneeded data records. Data records are unneeded if they are known to be collected elsewhere. A policy framework enables the NSP to configure what to collect where.

Filtering and/or aggregation can be done at any point along a data enhancement (described below) so that aggregation schemes can be based on enhanced data records as they are accumulated. The filtering and/or aggregation points are treated by the system 100 as pipe ISMs which are flow termination and flow starting points (ie: like an asynchronous ISM on the starting end and like a database on the terminating end). Data enhancement paths and filtering and/or aggregation schemes can be based on accumulated parameters such as user identification information and a user's contract type.

As noted above, the PISM can be used in the context of filtering and/or aggregation. One or more record flows can terminate at the PISM and can be converted into one or more new record flows. Record flows are grouped based on matching rules that apply to some of the fields in the record flows, while others are accumulated or undergo some other operation such as "maximum" or "average". Once the groups of accumulated records have reached some threshold, new accumulated records are output. This can be used for example in order to achieve a business-hybrid filtering and aggregation data reduction by imposing the business rules or the usage-based products that are offered to the customer, onto the record flows as they are collected in real-time. This is done instead of previous system where the information is stored in a database and then database operations are performed in order to create bills or reports. The filtering and aggregation reduces the amount of data that is stored in the central database 175 while not jeopardizing the granularity of data that is necessary in order to create creative usage-based products.

Typically, data collected from a single source does not contain all the information needed for billing and accounting, such as user name and organization. In such cases, the data is enhanced. By combining IP session data from multiple sources, such as authentication servers, DHCP and Domain Name servers, the gatherers create meaningful session records tailored to the NSP's specific requirements. In the example of FIG. 1, the gatherer 161 can provide information to the gatherer 162 so that the source IP address for an Internet session from the proxy server 101 can be combined with the domain address from the DNS server 102.

The enhancement procedure can be triggered by an asynchronous ISM. The information from the asynchronous ISM is associated with field enhancements in the central database 175. A field enhancement defines how a field in the central database is filled from the source data obtained from the asynchronous ISM. Through the field enhancements, the missing parameters are added to a record using the data collected from one or more synchronous ISMs. Enhancements are described in detail below.

The gatherers can include caches and buffers for storing information from the ISMs. The buffers allow the gatherers to compensate for situations where there is a loss of connection with the rest of the system 100. The caches can reduce the number of accesses to an information source. The buffer and/or cache sizes can be remotely configured.

Central Event Manager (CEM)

The Central Event Manager (CEM) 170 acts as the central nervous system of the system 100, providing centralized, efficient management and controls of the gatherers and the ISMs.

The CEM 170 can perform one or more of the following tasks:

Coordinates, controls, and manages the data collection process. The CEM 170 coordinates the operation of the gatherers and manages the flow of data through the system 100 through the collection scheme defined in the system configuration. The latter includes the configuration of the gatherers, the ISMs, the network devices, the fields in the central database 175 (described below), and the enhancement procedures. Based on the collection scheme the CEM 170 determines the system 100's computation flow (the set of operations the system 100 must perform to obtain the desired information). The CEM 170 then controls all the gatherers, instructing them to perform, in a particular sequence, the operations defined in the computation flow. The CEM 170 receives the records collected by the gatherers and stores them in the central database 175. NSPs can configure the CEM 170 to merge duplicate records before storing them in the central database 175. Record merging is described below.

Performs clean-up and aging procedures in the database 175. The system 100 collects and stores large amounts of session information every day. The CEM 170 removes old data to free space for new data periodically. The NSP defines the expiration period for the removal of old records. The CEM 170 is responsible for coordinating the removal of records from the central database 175. The CEM 170 places a time stamp on every record when the record enters the central database 175 and deletes the record after the time period the NSP has defined elapses.

Provides centralized system-wide upgrade, licensing, and data security.

The NSP can perform version upgrades of the system 100 at the CEM 170. The gatherers can be automatically upgraded once a new version is installed on the host computer of the CEM 170. ISMs are also installed via the CEM 170 and exported to the gatherers. The CEM 170 maintains a list of licenses installed in the system and verifies periodically if the system is properly licensed. This feature lets the NSP centrally install and uninstall licenses. It also prevents unlicensed use of the system 100 and any of its components.

Monitors the state of the gatherers and ISMs. The gatherers periodically communicate with the CEM 170. The CEM 170 continuously monitors the state of each gatherer and network devices in the system 100. The CEM 170 can be fault-tolerant, that is, it can recover from any system crash. It coordinates the recovery of the system 100 to its previous state.

Central Database

The central database 175 is the optional central repository of the information collected by the system 100. The central database 175 is but one example of a sink for the data generated in the system 100. Other embodiments include other configurations. The central database 175 stores and maintains the data collected by the gatherers, as well as the information on the configuration of the system 100. Thus, in configuring the system 100, the NSP defines what data will be stored in each field in the central database 175 and how that data is collected from the ISMs.

The information on network sessions is stored in the database in the form of a table. Each field in the table represents a network session parameter. Each record describes a network session. The system 100 has a set of pre-defined fields that are configured by the CEM 170 on installation. The NSP can modify the central database 175 structure by adding, deleting, or modifying fields. The NSP access the data in the central database 175 by running queries and reports. The old data is removed from the central database 175 to free space for new data periodically. You can specify the time interval for which records are stored in the central database 175. The structure of the central database 175 with some of the predefined fields is illustrated in the following figure.

As each IP session may generate multiple transaction records, during the merge process the CEM 170 identifies and discards duplications, enhancing the efficiency of the data repository. Generally, data records are passed through the merger program, in the CEM 170, into the central database 175. However, the data records are also cached so that if matching records appear at some point, the already stored records can be replaced or enhanced with the new records. The database tables that contain the record flows can be indexed, enhancing the efficiency of the data repository. A merge is achieved by matching some of the fields in a data record and then merging the matching records from at least two record flows, transforming them into one record before updating the central database 175. In some embodiments, adaptive tolerance is used to match records. Adaptive tolerance allows for a variation in the values of fields that are compared (e.g., the time field value may be allowed to differ by some amount, but still be considered a match). The adaptive aspect of the matching can include learning the appropriate period to allow for the tolerance. The reason that the records that do not match any previous records are sent through into the central database 175, in addition to being cached for later matching, is to avoid loss of data in case of system failure.

The following table illustrates an example of the types of records stored in the central database 175 by the CEM 170.

The system 100 supports a non-proprietary database format enabling the central database 175 to run on any of a number of commercially available databases (e.g., MS-SQL Server, Oracle Server, DB2, etc.).

User Interface Server and Clients

The User Interface Server (UIS) 185 allows multiple clients (e.g. terminals 180) to access the system 100 through, the Microsoft Internet Explorer with Java™ Plug-in or Netscape Navigator with Java™ Plug-in. Other embodiments can use other applications to access the system 100. The main function of the UIS 185 is to provide remote and local platform independent control for the system 100. The UIS 185 can provide these functions through windows that correspond to the various components of the system 100. Access to the system 100 can be password protected, allowing only authorized users to log in to the system and protecting sensitive information.

The NSP can perform one or more of the following main tasks through the UIS 185:

Configure the system 100.

Create and run queries and reports on network activity and resource consumption.

Register and license the system 100.

C. Data Distillation

Figure 2:
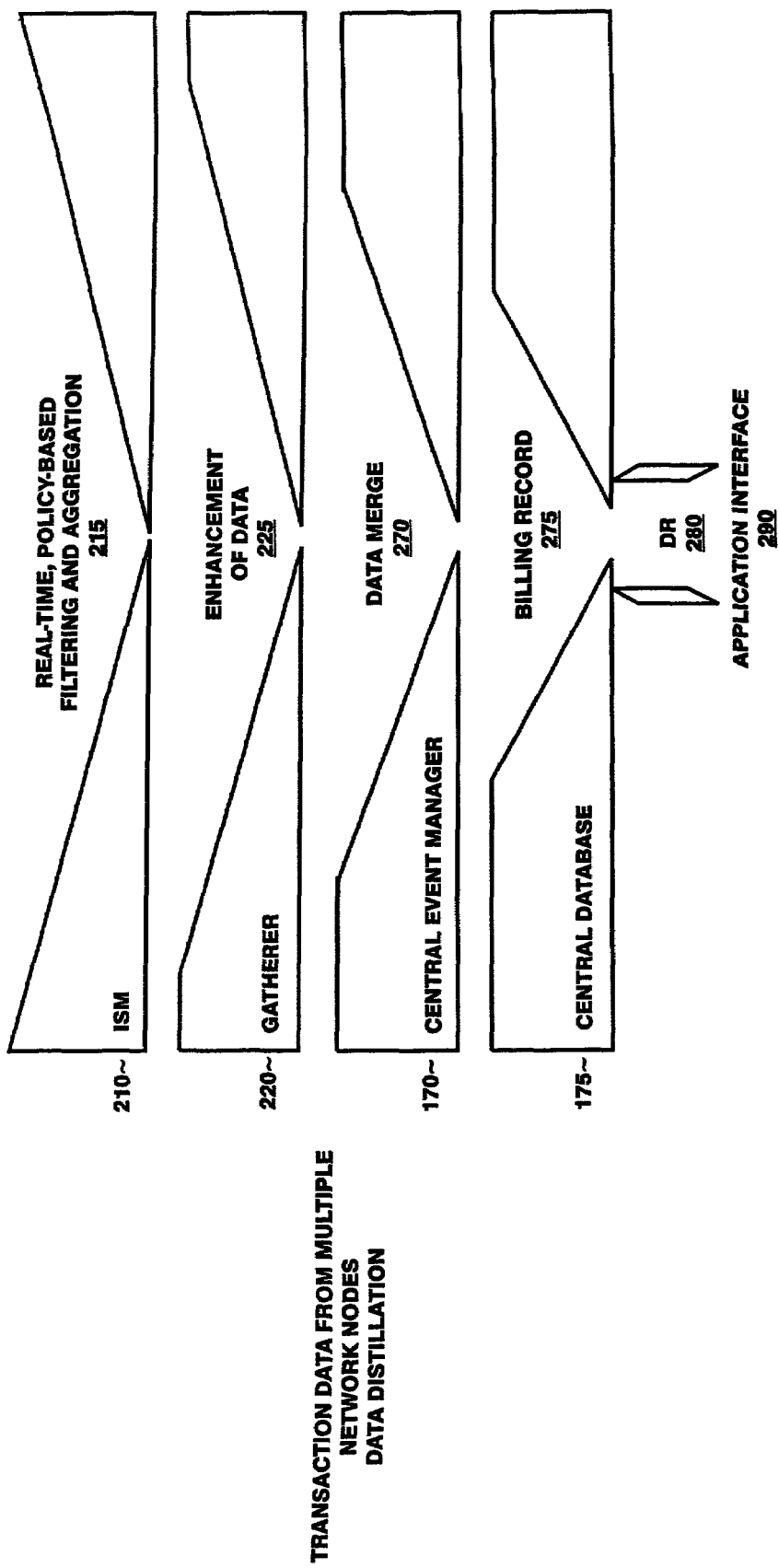
FIG. 2 illustrates an example of the data distillation used in the system of FIG. 1.

FIG. 2 illustrates the data distillation process performed by the system of FIG. 1. The data distillation aggregates and correlate information from many different network devices to compile data useful in billing and network accounting.

First, the ISMs 210 gather data from their corresponding network device. Note that for some ISMs (e.g. pipe ISMs), real-time, policy-based filtering and aggregation 215 can also be done. This data is then fed to the gatherers 220. The gatherers 220 perform data enhancement to complete the data from the ISMs 210. The results are provided to the CEM 170. The CEM 170 performs data merges 270 to remove redundant data. The merged data is then optionally stored in the central database 175 as a billing record 275 or is sent directly to an external system. The billing record information can be accessed from external applications, through the application interface 290, via a data record 280. Filtering and/aggregation and/or data enhancements can be done at any stage in the system 100.

D. Data Enhancement

As mentioned above, the gatherers 220 provide data enhancement features to complete information received from the ISMs 210. The following describes some example data enhancement techniques used in some embodiments of the invention.

| Source IP | Destination IP | Source Host | Destination Host | Service | Date/Time | Duration | Total Bytes | Counter |
|---|---|---|---|---|---|---|---|---|
| 199.203.132.187 | 204.71.177.35 | pcLev.xacct.com | yahoo.com | http | Apr. 26, 1998 10:56:55 | 6464 | 435666 | 261019 |
| 199.203.132.131 | 207.68.137.59 | prodigy.xacct.com | microsoft.com | telnet | Apr. 26, 1998 10:56:55 | 747 | 66743 | 261020 |
| 199.203.132.177 | 199.203.132.1 | pcEitan.xacct.com | xpert.com | smtp | Apr. 26, 1998 10:56:55 | 82 | 55667 | 261021 |
| 199.203.132.173 | 204.162.80.182 | pcAdi.xacct.com | cnet.com | http | Apr. 26, 1998 10:56:55 | 93 | 33567 | 261022 |

Figure 3:
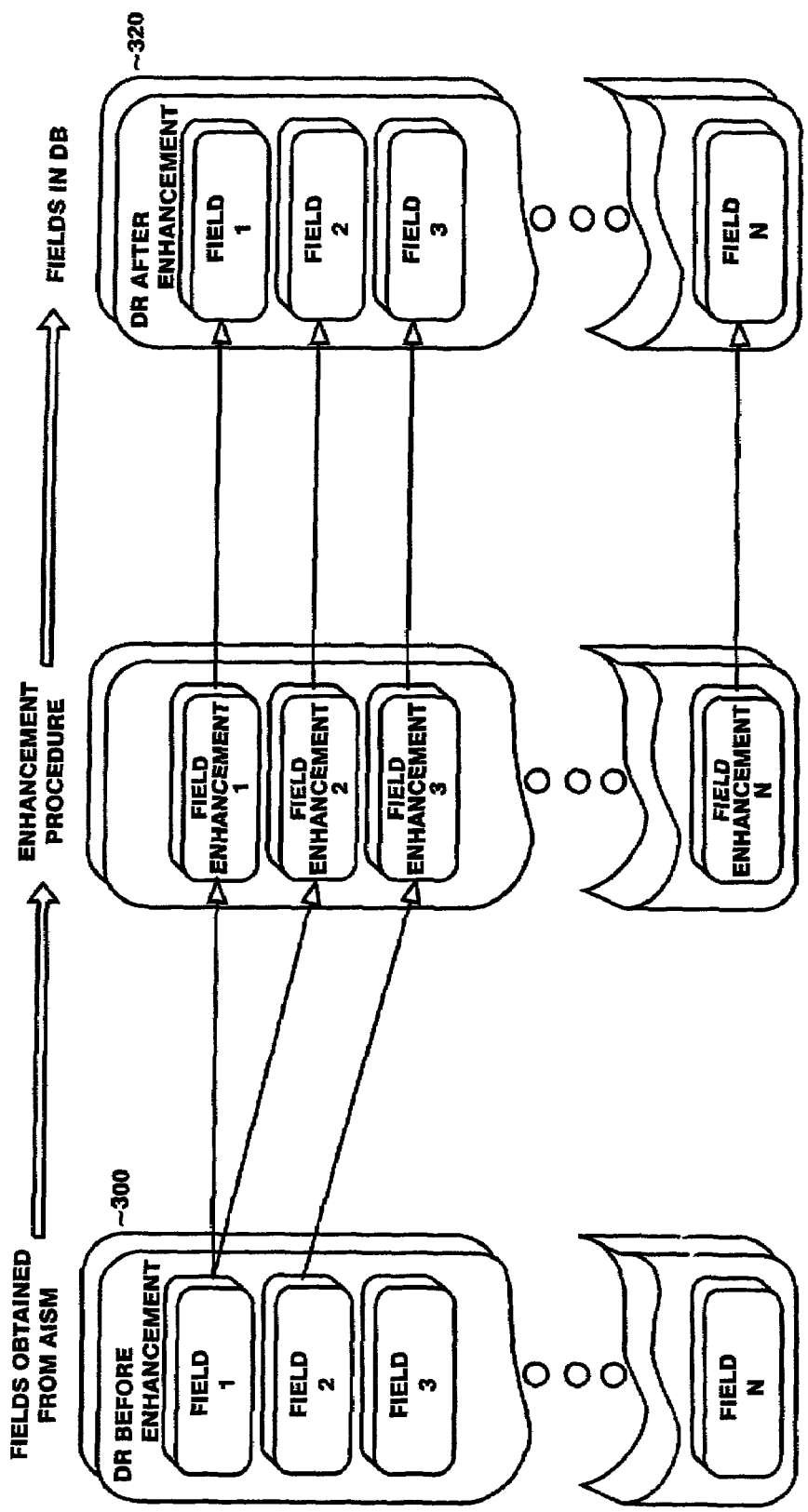
FIG. 3 illustrates data enhancements used in the data distillation.

FIG. 3 illustrates an example of data enhancement. Data enhancement comprises a number of field enhancements. A field enhancement specifies how the data obtained from the trigger of the enhancement procedure is processed before it is placed in a single field in the central database 175. The data can be placed in the field directly, or new information may be added to the record by applying a Synchronous ISM function. (In the example below, the function is "resolve the IP address to a host FQDN"). Field enhancements may involve one or multiple steps. There is no limit to the number of steps in a Field Enhancement. The data record starts with fields obtained from an asynchronous ISM 300. The fields in the DR 300 are then enhanced using the field enhancements. The enhanced fields result in the DR 320.

A visual representation of an enhancement can be presented to the NSP. The enhancement may include an itinerary of ISMs starting off with an AISM, passing through PISMs, and terminating in the CEM 170. Using this view of the system 100, the NSP need not be shown the actual flow of data since the flow may be optimized later in order to achieve better performance. This is more of a graphical logical view of how the enhancement is achieved in steps. (PISMs can terminate more than one flow and initiate more than one flow.)

A visual representation of a field enhancement shows the per-field flow of data correlation. This process ends in the CEM 170 or in a PISM. The NSP supplies information telling the system 100 how to reach each of the terminating fields (in the CEM 170 or the PISM) starting off from the initiating fields (PISM or AISM). Each step of enhancement defines cross correlation with some SISM function.

Figure 4A:
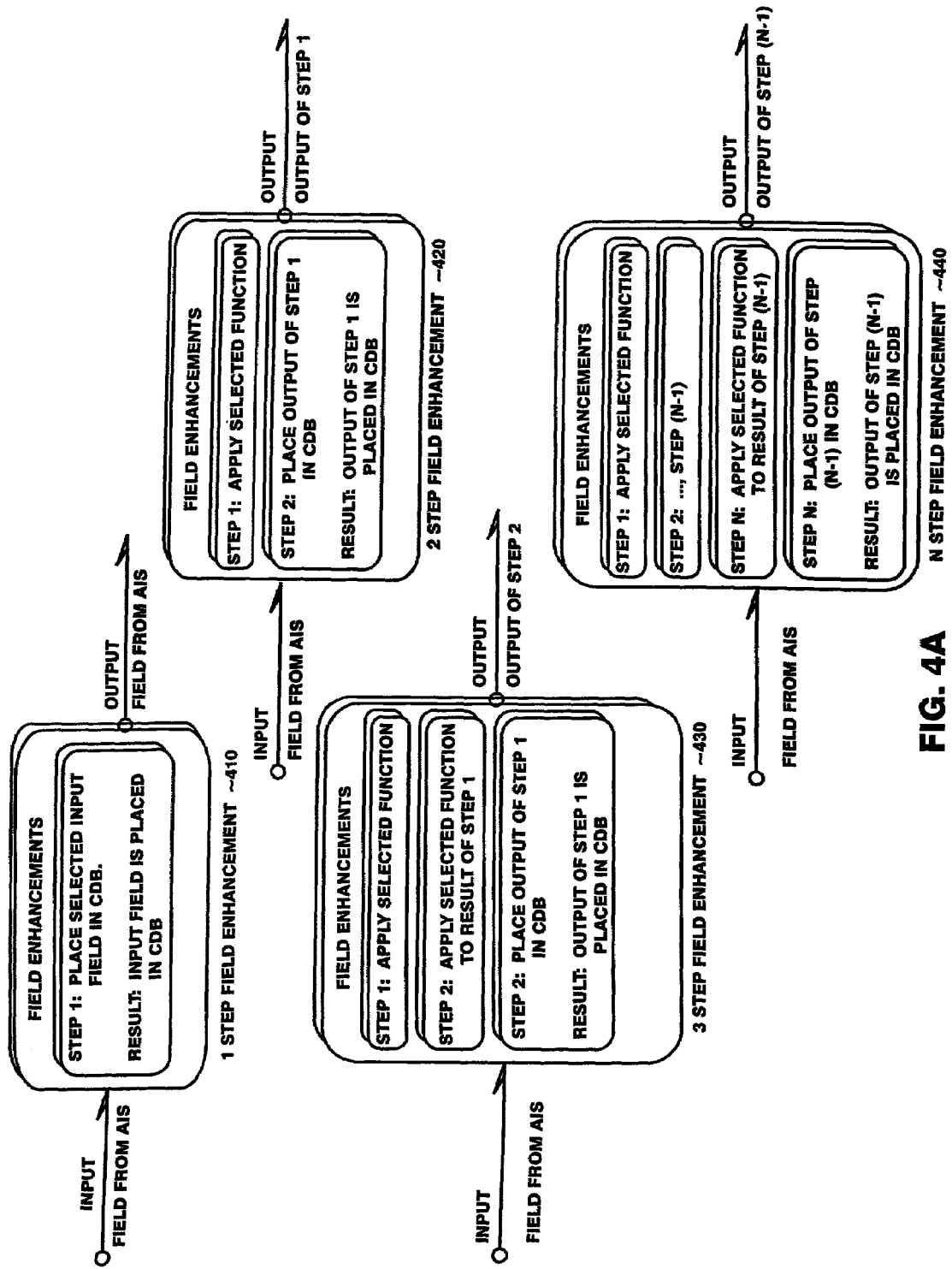
FIG. 4A illustrates example field enhancements that can be included in the data enhancements.

FIG. 4A illustrates various field enhancements (410 through 440). A field enhancement includes applying zero or more functions to a field before storing the field in a specified field in the central database 175.

One-step Field Enhancement 410. The initial source data from the asynchronous ISM is placed directly in a field in the central database 175. Example: the field enhancement for the Source IP field.

Two-step Field Enhancement 420. The initial source data from the asynchronous ISM is used to obtain new additional data from a synchronous network device and the new data is placed in a field in the central database 175. Example: the field enhancement for the Source Host field.

Three-step Enhancement 430. The initial source data from the asynchronous ISM is used to obtain additional data from a synchronous ISM. The result is used to obtain more data from another ISM and the result is placed in a field in the central database 175.

The following illustrates an example data enhancement. Suppose the data obtained from a proxy server 101 contains the source IP address of a given session, such as 199.203.132.2, but not the complete domain address of the host computer (its Fully Qualified Domain Name), such as www.xacct.com. The name of the host can be obtained by another network device—the Domain Name System (DNS 102) server. The DNS-server 102 contains information that matches IP addresses of host computers to their Fully Qualified Domain Names (FQDNs). Through an enhancement procedure the information collected from the proxy server 101 can be supplemented by the information from the DNS 102. Therefore, the name of the host is added to the data (the data record) collected from the proxy server 101. The process of adding new data to the data record from different network devices can be repeated several times until all required data is collected and the data record is placed in the central database 175.

Figure 4B:
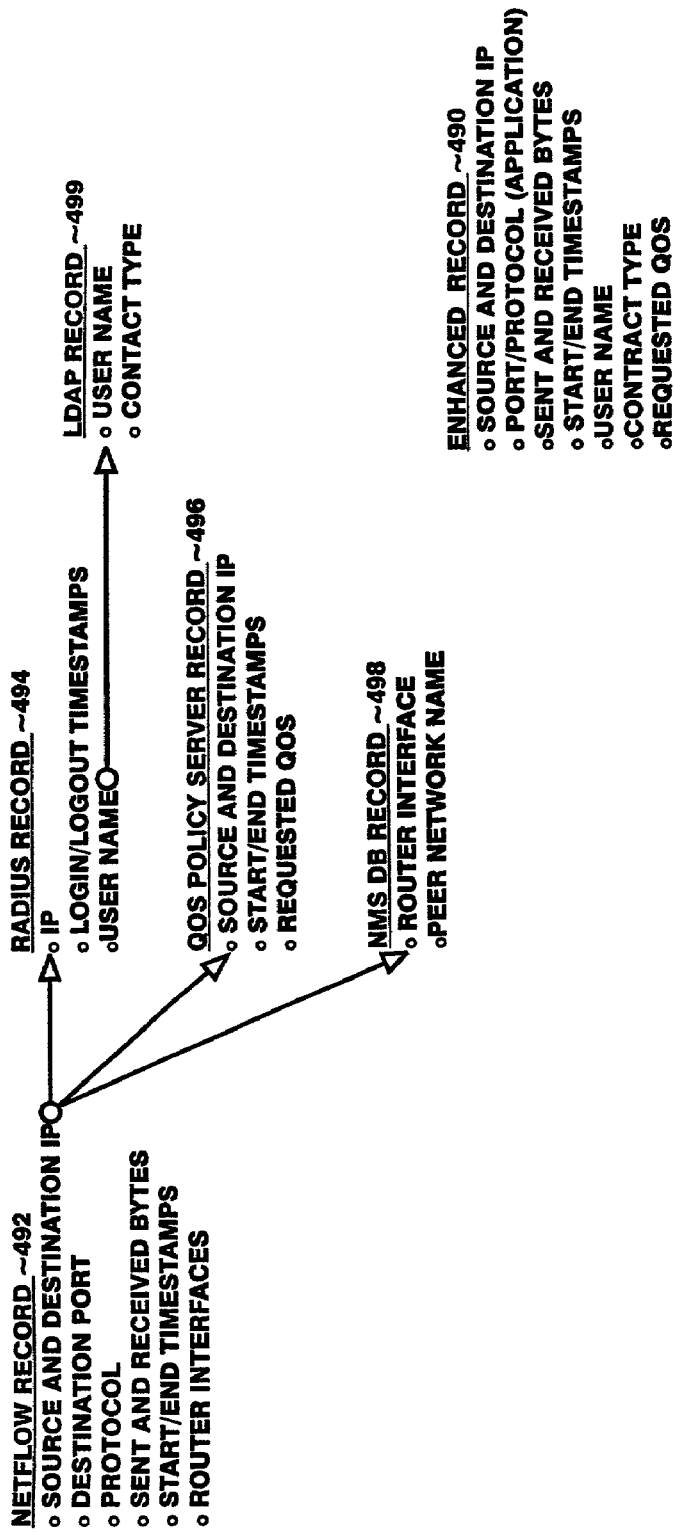
FIG. 4B illustrates the creation of an enhanced record.

FIG. 4B illustrates another example data enhancement where an enhanced record 490 is created from an initial netflow record 492. Fields in the enhanced record 490 are enhanced from the radius record 494, the QoS policy server record 496, the NMS DB record 498, and the LDAP record 499.

Defining Enhancement Procedures

The following describes the process for defining enhancement procedures in some embodiments of the system. Typically defining an enhancement procedures for the system 100 includes (1) defining enhancement procedures for each asynchronous ISM and (2) configuring field enhancements for all fields in the central database 175 for which the NSP wants to collect data originating from an asynchronous ISM that triggers the corresponding enhancement procedure.

An enhancement procedure can be defined as follows:
1. Access the CEM 170 using the UIS 180.
2. Select the enhancement procedures list using the UIS 180.
3. Define the name of the new enhancement procedure.
4. Select a trigger for the new enhancement procedure. The trigger can correspond to any asynchronous ISM in the system 100. Alternatively, the trigger can correspond to any asynchronous ISM in the system 100 that has not already been assigned to an enhancement procedure.
5. Optionally, a description for the enhancement procedure can be provided.
6. The new enhancement procedure can then be automatically populated with the existing fields in the central database 175. Optionally, the NSP can define the fields (which could then be propagated to the central database 175). Alternatively, based upon the type of asynchronous ISM, a preset set of fields could be proposed to the NSP for editing. What is important is that the NSP can define field procedures to enhance the data being put into the data records of the central database 175.
7. The NSP can then define the field enhancements for every field in the new enhancement procedure for which the NSP wants to collect data from the ISM that is the trigger of the new enhancement procedure.

Defining Field Enhancements

Defining a field enhancement involves specifying the set of rules used to fill a database field from the information obtained from the trigger of the enhancement procedure. The NSP defines field enhancements for each field in which NSP wants to collect data from the trigger. If no field enhancements are defined, no data from the trigger will be collected in the fields. For example, suppose the firewall asynchronous ISM 130 that triggers an enhancement procedure. Suppose the central database 175 has the following fields: source IP, source host, destination IP, destination host, user name, total bytes, service, date/time, and URL. If the NSP wants to collect session data for each field except the URL from the firewall ISM 130, which triggers the enhancement procedure, the NSP defines a field enhancement for each field with the exception of the URL.

In some embodiments, the field enhancements are part of the enhancement procedure and the NSP can only define and modify them when the enhancement procedure is not enabled.

The field enhancements can be defined in a field enhancement configuration dialog box. The field enhancement configuration dialog box can have two panes. The first displays the name of the enhancement procedure, the name of its trigger, and the name and data type of the field for which the NSP is defining the field enhancement. The second is dynamic and interactive. Its content changes depending on the NSP's input. When first displayed, it has two toggle buttons, End and Continue, and a list next to them. The content of the list depends on the button depressed.

When End is depressed, the list contains all output fields whose data type matches the data type of the field for which the NSP is defining the field enhancement. For example, if the field's data type is IP Address, the list contains all fields that are of the same type, such as source IP and destination IP that the AISM supplies. The fields in the list can come from two sources: (1) the source data which the gatherer receives from the trigger and (2) the result obtained by applying a synchronous ISM function as a preceding step in the field enhancement. The following notation is used for the fields:

OutputFieldName for the output of a field origination from the trigger

SISName.FunctionName(InputArgument). OutputField for the output of a field that is the result of applying a function SISName . . . OutputField for the output of a field that is the result of applying a function as the final step of a field enhancement The following examples are presented.

Source IP is the field provided by the trigger of the enhancement procedure that contains the IP address of the source host.

DNS . . . Host Name and DNS.Name(Source IP).Host name are the names of a field originating from the resolved function Name of a network device called DNS that resolves the IP address to a domain address. The input argument of the function is the field provided by the trigger of the enhancement procedure, called source IP. It contains the IP address of the source host. The function returns the output field called Host Name that contains the domain address of the source host. The notation DNS . . . Host Name is used when the field is the result of applying the function as the final step of a field enhancement. The notation is DNS.Name(Source IP).Host Name is used when the field is used as the input to another function.

In the user interface, if End is unavailable, none of the output fields matches the data type of the field.

When Continue is depressed, the list contains all applicable functions of the available synchronous network device configured in the system 100. If the preceding output does not match the input to a function, it cannot be applied and does not appear on the list.

The following notation is used for the functions:

SISName.FunctionName(InputFieldName:InputFieldDataType) →(OutputFieldName:OutputFieldDataType)

When the function has multiple input and/or output arguments, the notation reflects this. The arguments are separated by commas.

The following example shows a field enhancement.

DNS. Address(Host Name:String)→(IP Address:IP Address)

Where DNS is the name of the synchronous ISM (or network device) as it appears in the system configuration.

Address is the name of the function.

(Host Name:String) is the input to the function—host FQDN of data type String (IP Address:IP Address) is the output—IP address of data type IP Address The NSP can define the field enhancement by choosing items from the list. The list contains the option <none> when the End button is depressed. Choosing this option has the same effect as not defining a field enhancement: no data from the trigger will be stored in the field in the central database 175.

E. Record Merges

Figure 5:
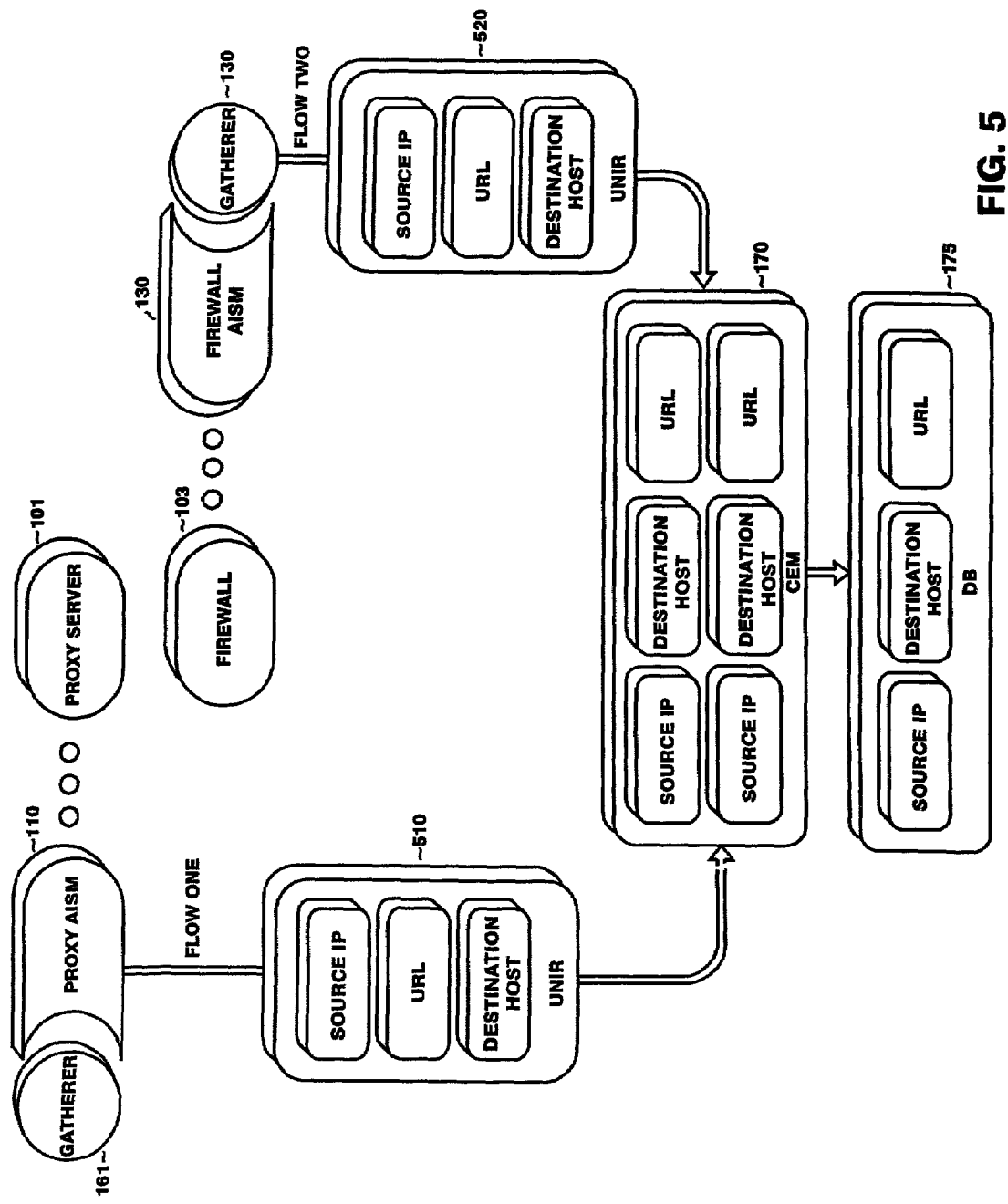
FIG. 5 illustrates an example record merge.

FIG. 5 illustrates an example record merge. Record merging removes duplicate records from the central database 175.

The following example shows how merges work and illustrate, the need for merging duplicate records. Suppose the system 100 is using two asynchronous ISMs 110 and 130. All outbound network traffic going through the proxy server 101 is routed through the firewall 103. The firewall 103 records the proxy server 101 as the source of all sessions passing through the proxy server 101, although they originate from different workstations on the network. At the same time, the proxy server 101 records the destination of all sessions as the firewall 103, although their actual destinations are the different Internet sites.

Therefore, all sessions are logged twice by the system 100 and the records are skewed. The data from the firewall 103 indicates the destination of a given session, but not the source (see data record 520), while the data from the proxy server 101 records the source, but not the destination (see data record 510). Defining a merge eliminates the duplication of records.

A merge can be defined instructing the CEM 170 to store the destination data obtained from the firewall 103 and the source data from the proxy server 101 in the central database 175. The merge will also eliminate the problem of skewed data by storing the correct source and destination of the session in the central database 175. Both network devices provide information on the URL. The latter can be used to identify the fact that the two seemingly independent records (510 and 520) are actually two logs of the same session.

Two enhancement procedures are defined for the example of FIG. 5. The trigger of the first, designated Flow One, is the Proxy Server Asynchronous Information Source Module. The trigger of the second, Flow Two, is the Firewall Asynchronous Information Source Module. The records from Flow One and Flow Two are records of the same session. They both have the same value for the URL field. Based on this value, the CEM 170 identifies the two records are double logs of the same session. It merges the two data records taking the Source IP value from Flow One and the Destination IP from Flow Two as the values to be stored in the central database 175.

Defining Merges

The following describes defining merges. A merge is a set of rules that specify how duplicate records from multiple enhancement procedures must be identified and combined before being stored in the central database 175. The NSP can merge the records from two or more enhancement procedures. To define a merge, the NSP identifies the following information.

The enhancement procedures included in the merge.

How to identify duplicate records (which fields of the records must match).

How to combine the records; that is, for each field, which value (from which enhancement procedure) must be stored in the central database 175.

(Optional)

If the NSP does not specify how records must be combined, the records are merged as follows:

When the values in all but one of the fields are null, the non-null value is stored.

When the fields contain non-null values, the value of the first record received (chronologically) is stored.

F. Additional Embodiments

The following describes additional embodiments of the invention.

In some embodiments, the user interface used by an NSP to configure the system 100 can be presented as a graphical representation of the data enhancement process. Every step in the enhancement can be shown as a block joined to another block (or icon or some graphical representation). The properties of a block define the operations within the block. In some embodiments, the entire data enhancement process from network devices to the central database 175 can be shown by linked graphics where the properties of a graphic are the properties of the enhancement at that stage.

In some embodiments, multiple CEMs 170 and/or central databases 175 can be used as data sources (back ends) for datamart or other databases or applications (e.g., customer care and billing systems).

In some embodiments, the types of databases used are not necessarily relational. Object databases or other databases can be used.

In some embodiments, other platforms are used. Although the above description of the system 100 has been IP network focused with Unix or Windows NT systems supporting the elements, other networks (non-IP networks) and computer platforms can be used. What is important is that some sort of processing and storing capability is available at the gatherers, the CEMs, the databases, and the user interface servers.

In some embodiments, the gatherers and other elements of the system 100, can be remotely configured, while in other embodiments, some of the elements need to be configured directly. For example, a gatherer may not be remotely configurable, in which case, the NSP must interface directly with the computer running the gatherer.

In other embodiments, the general ideas described herein can be applied to other distributed data enhancement problems. For example, some embodiments of the invention could be used to perform data source extraction and data preparation for data warehousing applications. The gatherers would interface with ISMs that are designed to extract data from databases (or other data sources). The gatherers would perform filtering and aggregation depending upon the needs of the datamart (in such an embodiment, the central database and CEM could be replaced with/used with a datamart). The data enhancement would then be done before storing the information in the datamart.

Figure 6:
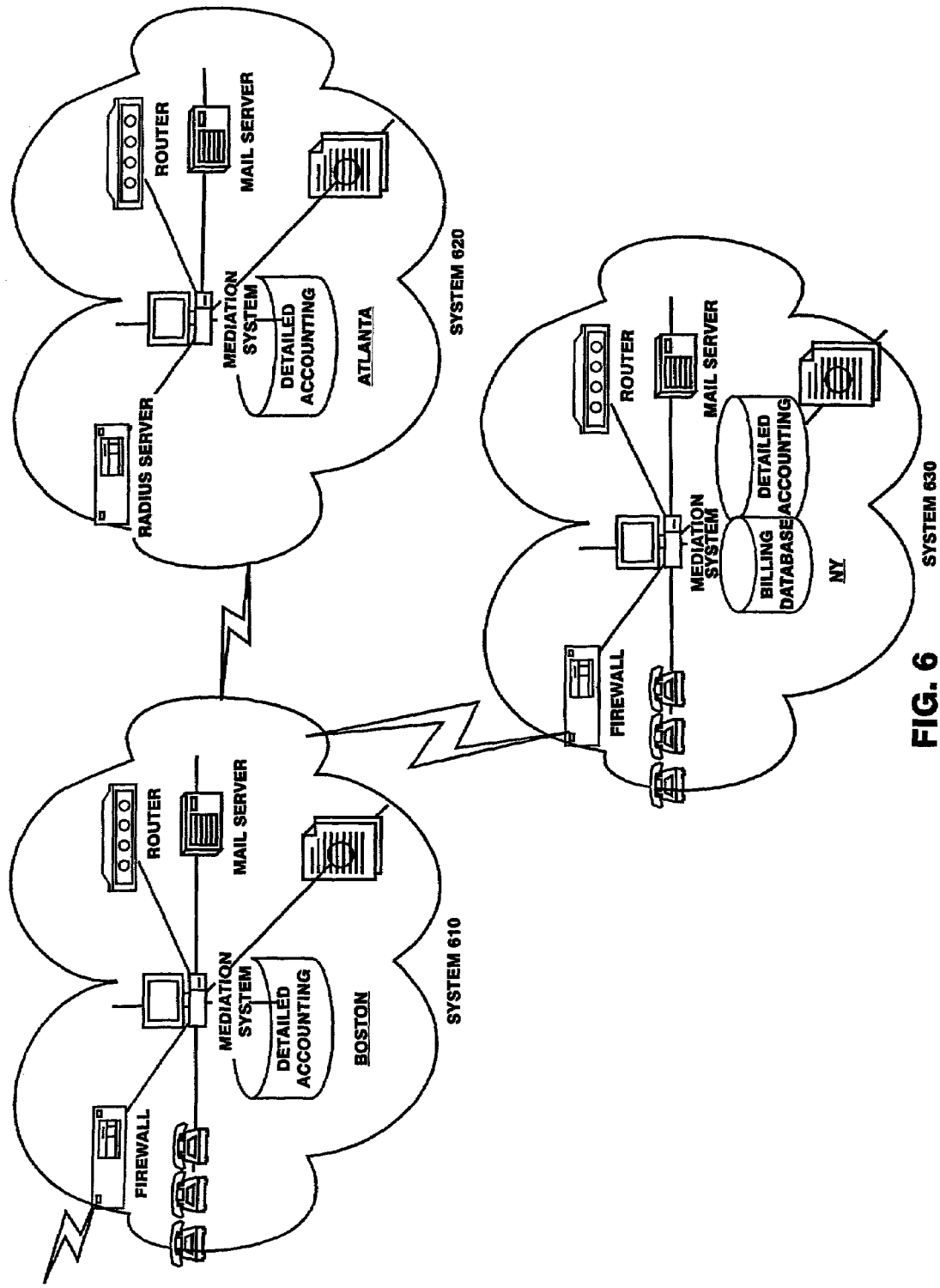
FIG. 6 illustrates an example of an alternative embodiment of the system.

FIG. 6 illustrates a system 600 where multiple systems 100 are linked together. This system could be an ISPs point of presence accounting system. The system 620 and the system 610 can store detailed network accounting information in their local detailed accounting databases. This information can then be aggregated and sent over the more expensive long distance links to the billing database in the system 630. Customer service information can still be accessed at the detailed accounting database, but the aggregated information may be all that is needed to create the bills.

Additional embodiments of the invention are described in the attached appendices A-F.

G. Conclusions

A network accounting and billing system and method has been described. In some embodiments, the system can access any network related information sources such as traffic statistics provided by routers and switching hubs as well as application server access logs. These are accumulated in a central database for creating auditing, accounting and billing reports. Because of the distributed architecture, filtering and enhancements, the system efficiently and accurately collects the network usage information for storage in a form that is useful for billing and accounting.

What is claimed is:

1. A computer program product embodied on a computer readable storage medium for processing network accounting information comprising:
    computer code for receiving from a first source a first network accounting record;
    computer code for correlating the first network accounting record with accounting information available from a second source; and
    computer code for using the accounting information with which the first network accounting record is correlated to enhance the first network accounting record.

2. The computer program product embodied on a computer readable storage medium of claim 1, wherein the enhancement is based on a policy.

3. The computer program product embodied on a computer readable storage medium of claim 2, wherein the accounting information includes parameters and wherein the using comprises adding at least one parameter from the accounting information to the first network accounting record.

4. The computer program product embodied on a computer readable storage medium of claim 3, wherein the accounting information is in the form of a second network accounting record.

5. The computer program product embodied on a computer readable storage medium of claim 4, wherein the second source is a network source, further comprising:
    computer code for receiving the second network accounting record from the second source.

6. The computer program product embodied on a computer readable storage medium of claim 3, wherein the second source is a memory, further comprising:
    computer code for providing the accounting information to the memory for storage.

7. A method of processing network accounting information comprising:
    receiving from a first source a first network accounting record;
    correlating the first network accounting record with accounting information available from a second source; and
    using the accounting information with which the first network accounting record is correlated to enhance the first network accounting record.

8. The method of claim 7, wherein the enhancement is based on a policy.

9. The method of claim 8, wherein the accounting information includes parameters and wherein the using comprises adding at least one parameter from the accounting information to the first network accounting record.

10. The method of claim 9, wherein the accounting information is in the form of a second network accounting record.

11. The method of claim 10, wherein the second source is a network source, further comprising:
    receiving the second network accounting record from the second source.

12. The method of claim 9, wherein the second source is a memory, further comprising:
    providing the accounting information to the memory for storage.

13. A system for collecting data from network entities for a data consuming application, comprising:
    a plurality of data collectors to receive information from the network entities and to produce records based on the information, each data collector in the plurality of data collectors being associated with and coupled to a different one of the network entities; and an enhancement component that augments data in one of the records produced by one of the plurality of data collectors with data from a different one of the records produced by another of the plurality of data collectors.

14. The system of claim 13, wherein the plurality of data collectors receive the records and correlate a first of the records with accounting information available from a second source and use the accounting information to enhance the first record.

15. The system of claim 14, wherein the enhancement is based on a policy.

16. The system of claim 14, wherein the accounting information includes parameters and the enhancement component adds at least one parameter from the accounting information to the first record.

17. The system of claim 13, further comprising:

a module coupled to the plurality of data collectors, the module receives the records produced by the plurality of data collectors for aggregation purposes, and wherein the enhancement component resides in the module.

18. A method for collecting data from network entities for a data consuming application having a policy, comprising:

receiving a first network record and a second network record, each associated with a different network entity and including data parameters of the associated different network entity;

determining that the first and the second network records are related;

determining from the policy that the first network activity is to be enhanced with one of the data parameters from the second network record; and adding the one of the data parameters from the second network record to the first network record.

19. The method of claim 18, wherein adding is performed by an enhancement component that resides in a module capable of aggregation.

20. An apparatus for enhancing network accounting data records for an accounting data consuming application having a policy, the apparatus coupled to a plurality of data collectors, each data collector collecting data from a different network entity, comprising:

a memory device for storing accounting data records received from the plurality of data collectors;

wherein a new accounting data record is correlated with one of the stored accounting data records; and an enhancement device, responsive to the policy, for augmenting the new accounting data record with data from one of the stored accounting data records with which the new accounting data record is correlated.

* * * * *

UNITED STATES PATENT AND TRADEMARK OFFICE
CERTIFICATE OF CORRECTION

PATENT NO. : 7,631,065 B2
APPLICATION NO. : 10/012962
DATED : December 8, 2009
INVENTOR(S) : Schweitzer et al.

Page 1 of 2

It is certified that error appears in the above-identified patent and that said Letters Patent is hereby corrected as shown below:

On the cover page:
Title (54) and Col. 1, lines 1-4; please replace "SYSTEM, METHOD AND COMPUTER PROGRAM PRODUCT FOR MERGING DATA IN A NETWORK-BASED FILTERING AND AGGREGATING PLATFORM" with --ENHANCEMENT OF NETWORK ACCOUNTING RECORDS--;

Inventors (75); please replace "Limor Schweitzer, Tel-Aviv (IL); Eran Wagner, Cupertino, CA (US); Tal Givoly, Cupertino, CA (US)" with --Limor Schweitzer, Santa Clara, CA (US); Eran Wagner, Los Altos, CA (US); Tal Givoly, Cupertino, CA (US)--.

In the Specification:
Col. 2, lines 25-66; please replace "A network accounting and billing system and method are described. In some embodiments, the system can access any network related information sources such as traffic statistics provided by routers and switching hubs as well as application server access logs. The information can be accumulated in a central database for creating auditing, accounting and billing reports. Alternatively, the information can be sent directly to other systems such as rating engines used in customer care and billing systems.

In one embodiment, network traffic information is captured at network information sources (examples of information sources include network devices). These sources provide detailed information about the network communications transactions at a network device. Importantly, different types of sources can provide different types of information. Gatherer devices gather the detailed information from the various information source devices and convert the information into standardized information. The gatherer devices can correlate the gathered information with account information for network transaction accounting. Manager devices manage the gatherer devices and store the gathered standardized information. The manager devices eliminate duplicate network information that may exist in the standardized information. The manager devices also consolidate the information. Importantly, the information stored by the manager devices represents the consolidated, account correlated, network transaction information used for billing. In addition to account information, transaction information can be correlated to other information such as geography information (e.g., the location of an accessed server) and/or transaction routing information (as may be Signed and Sealed this
Twelfth Day of February, 2013

Teresa Stanek Rea
*Acting Director of the United States Patent and Trademark Office* used in peering agreements between Internet Service Providers). The system thereby provides a distributed network accounting and billing system.

In some embodiments, the gatherer devices can access sources through proxy gateways, firewalls, and/or address translation barriers.

In some embodiments, the gatherer devices can correlate the information about a specific transaction with a particular account by accessing the transaction's source and/or destination information. The source and/or destination information is then correlated with account information from an account information database."

with

--A system and method are provided for processing network accounting information. A first network accounting record is received from a first source. Thereafter, the first network accounting record is correlated with accounting information available from a second source. The accounting information with which the first network accounting record is correlated is then used to enhance the first network accounting record.--.